(12) United States Patent
Keller et al.

(10) Patent No.: US 6,884,861 B2
(45) Date of Patent: Apr. 26, 2005

(54) METAL NANOPARTICLE THERMOSET AND CARBON COMPOSITIONS FROM MIXTURES OF METALLOCENE-AROMATIC-ACETYLENE COMPOUNDS

(75) Inventors: Teddy M. Keller, Fairfax Station, VA (US); Joseph Perrin, Centerville, VA (US); Syed B. Qadri, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 382 days.

(21) Appl. No.: 10/006,385

(22) Filed: Dec. 10, 2001

(65) Prior Publication Data

US 2003/0109619 A1 Jun. 12, 2003

(Under 37 CFR 1.47)

(51) Int. Cl.⁷ ............................................. C08F 38/00

(52) U.S. Cl. ...................... 526/285; 526/346; 524/440; 524/174; 423/447.5; 428/408; 428/367

(58) Field of Search ................................ 526/285, 346; 524/440, 174; 423/447.5; 428/408, 367

(56) References Cited

U.S. PATENT DOCUMENTS

| | | | |
|---|---|---|---|
| 3,713,865 A | | 1/1973 | Leeds |
| 5,389,400 A | * | 2/1995 | Ting et al. ............... 427/249.2 |
| 5,876,687 A | | 3/1999 | Hung |
| 5,948,475 A | | 9/1999 | Hung |
| 6,039,930 A | | 3/2000 | Hung |
| 6,103,210 A | | 8/2000 | Hung |

FOREIGN PATENT DOCUMENTS

| JP | 60153943 A2 | 8/1985 |
|---|---|---|

OTHER PUBLICATIONS

Jacoby, Data Storage: New Materials Push the Limits, Jun. 12, 2000, C&EN, pp 37–45.
Koltypin et al, Encapsulation of Nickel Nanoparticles in Carbon Obtained by the Sonochemical Decomposition of Ni(C8H12)2, Chem. Mater., 1999, vol. 11, pp. 1331–135.
Morales et al, Surface and Internal Spin Canting in γ–Fe2O3 Nanoparticles, Chem Mater., 1999, vol. 11, pp. 3058–3064.
Jia et al, Some Acetylene and Hydride Chemistry of Group 8 Metal Complexes with Cyclopentadienyls and their Analogous Ligands, J. Organometallic Chemistry, 565, (1998), pp. 37–48.
Kruis et al, Synthesis of Nanoparticles in the Gas Phase for Electronic, Optical and Magnetic Applications—A Review, J. Aerosol Sci. vol. 29, No. 5/6, pp. 511–535, 1998.

Carpenter et al, Organometallic Compounds as Single–source Precursors to Nanocomposite Materials: An Overview, J. Organometallic Chemistry 557 (1998) pp. 121–130.

(Continued)

*Primary Examiner*—Ling-Sui Choi
(74) *Attorney, Agent, or Firm*—John J. Karasek; Joseph T. Grunkemeyer

(57) ABSTRACT

The present invention provides for a composition comprising:

a composition formed by heating to a temperature of from about 300° C. and above a mixture of:
an organometallic composition and an aromatic-acetylene containing compound; and
wherein said organometallic composition comprises the formula:

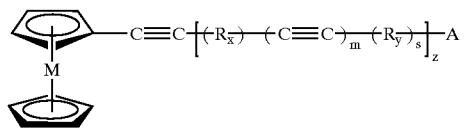

wherein A is selected from the group consisting of H,

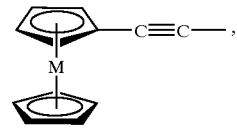

and

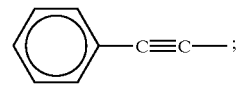

wherein M is a metal;
wherein Rx and Ry are independently selected from the group consisting of an aromatic, a substituted aromatic group and combinations thereof;
wherein m, s and z are $\geq 0$;
wherein m and s are independently determined in each repeating unit;
wherein said aromatic-acetylene containing composition is 1,2,4,5-tetrakis(phenylethynyl)benzene, 1,2,4-tris(phenylethynyl)benzene or 1,3,5-tris(phenylethynyl)benzene; and
wherein said organometallic composition and said aromatic-acetylene composition are molar mix proportions of between 1 and 99 of said organometallic composition and between 99 and 1 of said aromatic-acetylene composition.

19 Claims, 2 Drawing Sheets

OTHER PUBLICATIONS

Manziek et al, Functionalized Emulsion and Suspension Polymer Particles: Nanoreactors for the Synthesis of Inorganic Materials, Chem. Mater., 1998, vol. 10, pp 3101–3108.

Fink et al, Ethynylferrocene Compounds of 1,3,5–Tribromobenzene, Organometallics, 1997, vol. 16, pp. 2646–2650.

Moumen et al, New Synthesis of Cobalt Ferrite Particles in the Range 2–5nm: Comparison of the Magnetic Properties of the Nanosized Particles in Dispersed Fluid or in Powder Form, Chem. Mater., 1996, vol. 8, pp. 1128–1134.

Hsung et al, Synthesis and Characterization of Unsymmetric Ferrocene–Terminated Phenyletheynyl Oligomers Cp2Fe–[C=C–C6H4]n–X(X=SH, SMe, SOMe, and SO2Me) Organometallics, 1995, vol. 14, pop. 4808–4815.

Moller et al, Inorganic Nanoclusters in Organic Glasses– Novel Materials for Electro–optical Applications, Synthetic Metals, 41–43 (1991) pp 1159–1162.

Hess et al, Polymers for Stabilization of Colloidal Cobalt Particles, J. Applied Polymer Science, vol. 10, (1966), pp. 1915–1927.

Thomas, Preparation and Magnetic Properties of Colloidal Cobalt Particles, J. Appl. Phys., (1966).

Keller et al, Polymeric and Carbon Compositions with Metal Nanoparticles, U.S. Appl. No. 10/006,226, filed Dec. 12, 2001.

\* cited by examiner

PRELIMINARY X-RAY DIFFRACTION RESULTS ON METAL NANOPARTICLE COMPOSITION

| TEMPERATURE (°C) | TIME AT T (h) | Fe PARTICLE SIZE (nm) |
| --- | --- | --- |
| 600 | 4 | 16.6 |
| 800 | 4 | 28.0 |
| 1000 | 4/0 | 29.3 / 19.7 |
| 1400 | 2 | 31.3 |

FIG. 2

METAL NANOPARTICLE THERMOSET AND CARBON COMPOSITIONS FROM MIXTURES OF METALLOCENE-AROMATIC-ACETYLENE COMPOUNDS

BACKGROUND OF THE INVENTION

1. Field of the Invention

The present invention relates generally to organic compositions containing a metal, and more specifically, to polymer compositions containing metallocene(s) and/or metal nanoparticles and carbon compositions containing metal nanoparticles homogeneously dispersed therethrough from mixtures of metallocene-aromatic-acetylene compounds, and methods for manufacturing.

2. Description of the Background Art

Because of processing advantages, polymers containing transition metals can be of considerable interest as potential pyrolytic precursors to metallic nanoparticle carbon and ceramic compositions. The design and synthesis of macromolecules that incorporate transition metals or transition metal complexes as essential structural elements constitutes an area of growing research interest promoted largely by the prospect that such materials may possess novel catalytic, optical, redox, magnetic, or electrical properties. The use of such materials as precursors to transition metal-containing carbon and ceramic compositions is virtually unexplored. Most approaches to such materials have involved chemical modification of preformed preceramic polymers such as the derivatization of liquid poly(methylsilanes) by dehydrogenative coupling using $MMe_2(C_5H_5)_2$(M=Ti, Zr, or Hf) which yields SiC/MC composites after pyrolysis. Studies of the thermal stability by thermogravimetric analysis (TGA) have shown that these polymers undergo significant weight loss (35–56%) between 350–500° C. but show no further weight loss up to 1000° C. The lustrous ceramic products formed when ferrocene-containing polymers are heated to about 500° C. under a slow flow of nitrogen are ferromagnetic and have been characterized as amorphous iron silicon carbide materials by X-ray photoelectron spectroscopy (XPS) and energy dispersive X-ray (EDA) microanalysis. Other approaches have involved the pyrolysis of poly (silylacetylenes) or other silicon-containing polymers in the presence of transition-metal powders or oxides to yield MC/MSi/SiC or SiC/MN composites.

Carbon-carbon (C—C) composites are emerging materials with potential applications as high temperature structural materials for the space and aerospace industries. This is because they possess not only light-weight but high thermal conductivity and high dimensional stability up to 3000° C. in a protective environment. Carbon-carbon composites are prepared by using carbon fibers as reinforcement and thermosetting or thermoplastic resins as matrix precursors. On pyrolysis, the thermosetting resin yields a non-graphitic matrix whereas the thermoplastic resin leads to graphitic carbon. Matrix microstructure plays an important role in deciding the overall performance and particularly the mechanical properties of C—C composites. Numerous studies have been carried out to understand and control the microstructure and the degree of graphitization in the developing matrix under various carbonization conditions. In addition to carbon precursor material, the heat treatment temperature, which is typically between 2000 and 3000° C., also influences the degree of graphitization. Several methods have been investigated to improve the degree of graphitization under milder conditions. One such method is catalytic graphitization, which is brought about by addition of certain inorganic and organic additives to the matrix precursors before conversion to the carbonaceous matrix. The overall effect is to lower the temperature needed to achieve a certain degree of graphitization. Very little research has been reported using melt processable polymeric and carbon precursor materials containing organometallic groups. During the heat treatment, the organometallic units are destroyed and the metal particles are molecularly dispersed homogeneously throughout the matrix.

Dispersion of very small metal particles in polymeric, carbon, or ceramic matrices are scientifically and technologically important for a variety of reasons. The preparation of nanoscale materials with unique properties represents a significant challenge. Materials with particles in the range of 1–10 nanometers would be expected to exhibit unique properties due to their extremely small dimensions. One potential advantage of a dispersed particle system is that many of its properties are strongly dependent on the interfacial properties of the materials because the fraction of the overall materials, which is in the vicinity of the fraction of an interface, is quite high. In addition to simply providing a large interfacial area, dispersions of very small inorganic particles may have useful electronic, optical, magnetic, chemical, catalytic and unique mechanical properties. Many of these properties such as superparamagnetism in magnetic materials or tunable band gaps in quantum dot semiconductor arrays require that particle sizes and interparticle spacings should be in the nanometer range. Because of the similarity of these dimensions to the typical sizes of polymeric molecules, there is considerable interest in using polymeric materials to control the sizes and distributions of nanoparticle dispersions. One approach that has been employed by several groups is to use ordered block copolymers as templates for controlling the distributions of the metal particles. Unfortunately, the morphology of the underlying polymeric template and the morphology of the resultant particle dispersion were not related to each other in a completely straightforward way to afford uniform particle dispersion. This result can be partially explained in terms of kinetic limitations on particle coalescence in the presence of the polymer molecules in the solid state. Moreover, well-ordered arrays of metal particles with controlled sizes have been obtained in solvent-cast films. For practical reasons, it would be convenient to process and control metal dispersions from decomposition of organometallic containing polymers or compounds in the melt state. For example, the viscosity of the composition would be expected to control the diffusive properties of the individual metal particles and particle coalescence.

Molecular or macromolecular materials, which contain atoms or transition metal elements in close proximity, are attracting increasing attention because of their potentially interesting electrical, redox, optical, and magnetic characteristics. Small particles with diameters less than 10 nanometers exhibit material properties that strongly differ from those of bulk phases. Their electronic, magnetic, and optical properties contribute attractive prospects in the design of new electronic and optical devices, information storage, color imaging, bioprocessing, magnetic refrigeration, ferrofluids, gas sensors, etc. In these applications, small particles of metal oxides have been shown to be particularly important.

The general properties of metal nanoparticles or metal clusters of one to a few nanometers can be of immense importance on the basis of numerous investigations in the last few years. The physical properties of metal nanoparticles are attracting increasing interest because they may differ significantly from the bulk properties as a result of surface or quantum size effects. Quantum size effects open the door to novel future technologies. The success of such future applications of metal nanoparticles will strongly depend on the availability of one, two, or three dimensionally organized materials. To study quantum size behavior of small metal particles, the particles must be separated from each other to avoid coalescence and to keep the individual nature of the particles. Small crystallites behave like large molecules (e.g., polycyclic aromatic hydrocarbons) in their spectroscopic properties. They do not exhibit bulk semiconductor electronic properties. Metal nanoparticles or nanoclusters can be considered the building blocks of future modern technologies. This will be due to the size dependent electronic properties of these particles. Nanoparticles of transition metals become semiconductors if small enough. As the more technological problems such as organization and addressing of quantum dots are better understood, there is an almost unlimited field of applications to be foreseen. The properties of nanosized semiconductors have long been known to depend very sensitively on the particle size.

OBJECTS OF THE INVENTION

Accordingly, one object of the present invention is to provide a novel carbon composition having metal nanoparticles dispersed throughout the carbon composition formed from a mixture of monomers heated to between 200–1000° C.

Another object of the invention is to provide a novel polymer having metal nanoparticles dispersed throughout the polymer formed from a mixture of monomers heated to between 200–500° C.

Another object of the invention is to provide a novel thermoset having metal nanoparticles dispersed throughout the thermoset formed from a mixture of monomers heated to between 200–500° C.

Another object of the invention is to provide a novel polymer and/or carbon composition having metal nanoparticles dispersed homogeneously throughout in which the size and the separation of the metal nanoparticles are controlled.

Another object of the invention is to provide a novel polymer and/or carbon composition having metal nanoparticles dispersed homogeneously throughout and having magnetic and electrical properties.

These and additional objects of the invention are accomplished by the structures and processes hereinafter described.

SUMMARY OF THE INVENTION

The present invention is in one aspect a composition comprising:

a composition having iron nanoparticles dispersed homogeneously throughout said composition, wherein said composition is formed by heating to a temperature of from about 300° C. and above a mixture of:

a ferrocenylethynyl containing composition selected from the group consisting of 1,4-bis(ferrocenyl)butadiyne, 1-ferrocenylethynyl-4-(phenylethynyl)benzene and 1,3-bis (ferrocenylethynyl)benzene; and an aromatic-acetylene containing composition selected from the group consisting of 1,2,4,5-tetrakis(phenylethynyl) benzene, 1,3,5-tris(phenylethynyl)benzene and 1,2,4-tris (phenylethynyl)benzene; and wherein said ferrocenylethynyl containing composition and said aromatic-acetylene containing composition are molar mix proportions of between 1 and 99 of said ferrocenylethynyl containing composition and between 99 and 1 of said aromatic-acetylene containing composition.

The present invention is in another aspect of a composition formed by heating to a temperature of from about 300° C. and above a mixture of:

an organometallic composition and an aromatic-acetylene containing composition compound; and wherein said organometallic composition comprises the formula:

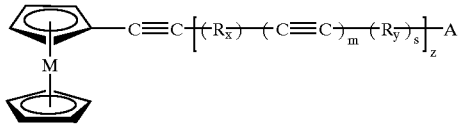

wherein A is selected from the group consisting of H,

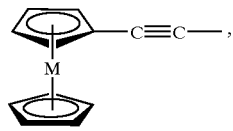

and

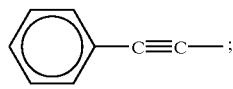

wherein M is a metal selected independently from the group consisting of Fe, Mn, Ru, Co, Ni, Cr and V;

wherein Rx is independently selected from the group consisting of an aromatic, a substituted aromatic group and combinations thereof;

wherein Ry is independently selected from the group consisting of an aromatic, a substituted aromatic group and combinations thereof;

wherein m is $\geq 0$;

wherein s is $\geq 0$;

wherein z is $\geq 0$;

wherein m and s are independently determined in each repeating unit;

wherein said aromatic-acetylene containing compound is selected from the group consisting of 1,2,4,5-tetrakis (phenylethynyl)benzene, 1,3,5-tris(phenylethynyl)benzene and 1,2,4-tris(phenylethynyl)benzene; and wherein said organometallic composition and said aromatic compound are molar mix proportions of between 1 and 99 of said organometallic composition and between 99 and 1 of said aromatic-acetylene containing compound.

The present invention is in another aspect a method of forming a composition containing iron nanoparticles homogeneously dispersed throughout, said method comprising the steps of:

mixing between 1 and 99 molar proportion of 1,4-bis (ferrocenyl)butadiyne and between 99 and 1 molar proportion of said an aromatic-acetylene containing composition selected from the group consisting of 1,2,4,5-tetrakis (phenylethynyl)benzene, 1,3,5-tris(phenylethynyl)benzene and 1,2,4-tris(phenylethynyl)benzene;

heating said mixture for at least 1 hour at between 300 and 1000° C.; and forming a thermoset or a carbon composition having metal nanoparticles dispersed homogeneously throughout.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein:

FIG. 2 is a Table of Preliminary X-Ray Diffraction Results on Metal Nanoparticles.

DETAILED DESCRIPTION OF THE PREFERRED EMBODIMENT

Figure 1:
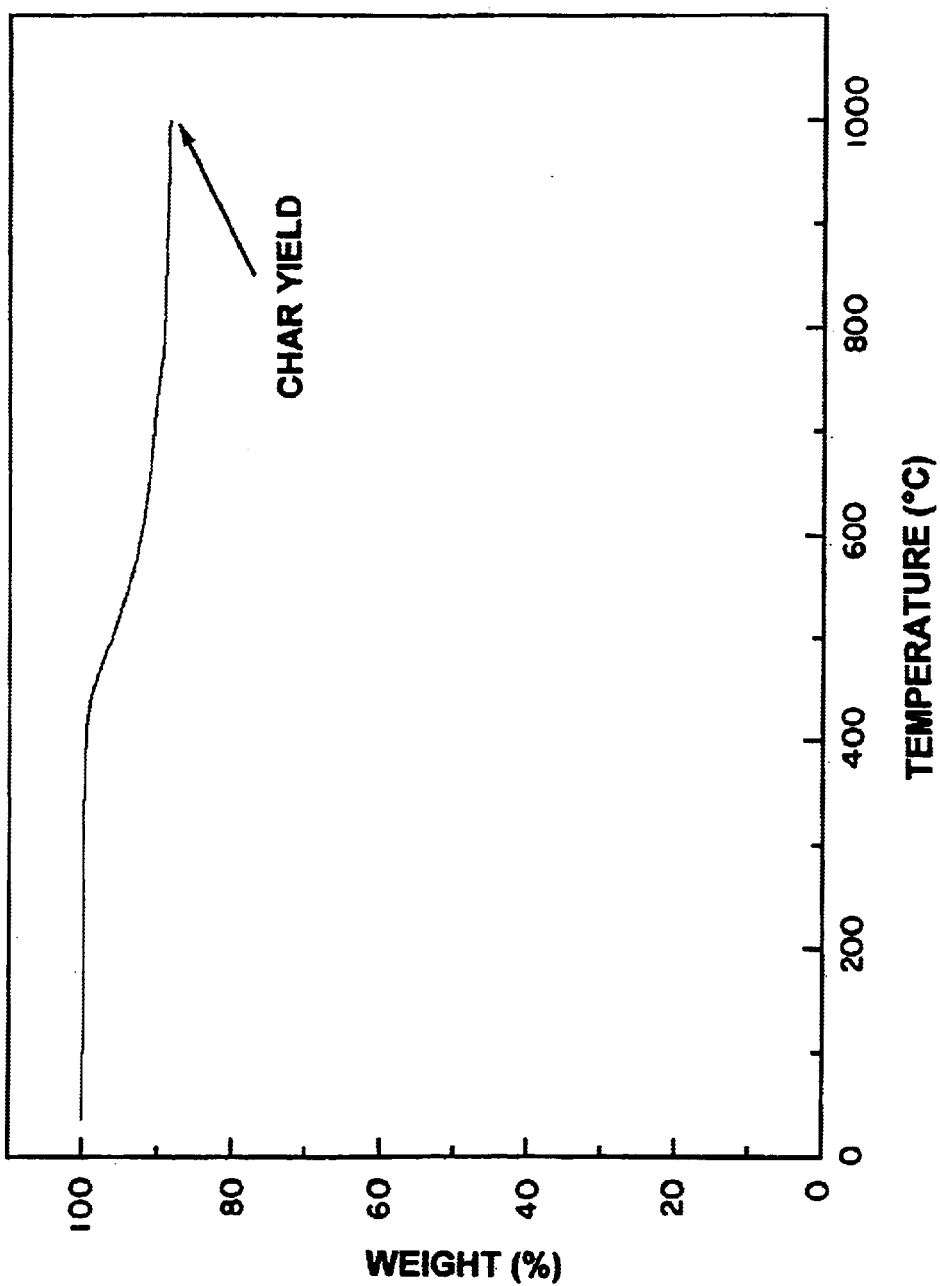
FIG. 1 is a graph of Weight vs Temperature for 50/50 Molar Blend of 1,2,4,5-tetra(phenylethynyl)benzene and 1,4-bis(ferrocenylethyny)butadiyne Thermoset at 1000° C.

Polymers containing organometallic units or transition metals are of interest as pyrolytic precursors to metal nanoparticle polymeric, carbon and ceramic compounds.

The precursor material should melt to a definite shape or form and the organometallic portion should decompose into elemental metal at fairly low temperature to ensure a broad range of properties in the developing composition. The coating of the metal nanoparticle with the media, thermoset or carbon composition, helps protect the metal particles against oxidation. Initiate atomic-scale mixing present in a polymer should promote the facile formation of 3D extended structures. The processing advantages of both organometallic compounds and polymers allows the preparation of metal nanoparticle objects, fibers and coatings.

Preparation of 1,4-bis(ferrocenyl)butadiyne is prepared according to a method disclosed in Polymeric and Carbon Compositions with Metal-Nanoparticles, Navy Case No. 82,460, filed on the same day as the present application and incorporated herein by reference. Example 1 describes the polymerization and carbonization of 1,4-bis(ferrocenyl) butadiyne.

Preparation of 1,2,4,5-tetrakis(phenylethynyl)benzene is prepared according to the method disclosed in U.S. Pat. No. 5,980,853, Aromatic Acetylenes as Carbon Precursors, and is incorporated herein by reference. Example 8 discloses the polymerization of 1,2,4,5-tetrakis(phenylethynyl)benzene through the acetylenic carbon-carbon triple bond, and Example 9 discloses the carbonization of 1,2,4,5-tetrakis (phenylethynyl)benzene by heating above 500° C.

Examples 15 and 16 describe the formation of carbon compositions from mixtures of 1,4-bis(ferrocenyl)butadiyne and 1,2,4,5-tetrakis(phenylethynyl)benzene in molar proportions between 50 to 75 of 1,4-bis(ferrocenyl)butadiyne and between 50 to 25 of 1,2,4,5-tetrakis(phenylethynyl) benzene when heated to 1000° C. The 75/25 molar mix that formed a carbon composition had a 79% char yield and the 50/50 molar mixture that formed a carbon composition had a 86% char yield. Fe nanoparticles were formed. Thermosets were formed when the molar mixture were heated to 240–250° C., and the carbon compositions were formed when the thermoset were heated to 1000° C. FIG. 1 provides a graph of Weight vs Temperature for 50/50 Molar Blend of 1,2,3,5-tetra(phenylethynyl)benzene and 1,4-bis (ferrocenylethyny)butadiyne Thermoset at 1000° C., Example 16.

Example 17 discloses the formation of fibers from the 50/50 molar mix while the mixture was viscous before gelation.

Examples 18 through 21 disclose molar mixtures of 10–50 molar proportions of 1,4-bis(ferrocenyl)butadiyne and between 90–50 molar proportions of 1,2,4,5-tetrakis (phenylethynyl)benzene that were heated to 1000° C. to form carbon compositions with char yields between 78 to 87%. In Examples 15–20, the resulting carbon compositions had magnetic properties.

Examples 30–32 disclose 50/50 molar mixtures that are heated to 600, 700 and 800° C., respectively, for 1 hour. The char yields were between 87 and 89%. Examples 33–36 disclose heating the 50/50 molar mixture to 500, 600, 800, 1000° C. for 4 hours. The size of the nanoparticles increased from 8.9 nm to 29.3 nm as the temperature was increased. Example 37 disclosed heating the 50/50 mixture to 1000° C. and then immediately cooling it to room temperature. The average size of the nanoparticles formed was 19.7 nm. Example 38 disclosed heating the 50/50 mixture to 1400° C. for 2 hours and forming 31.3 nm sized nanoparticles. Preliminary X-Ray Diffraction Results on Metal Nanoparticles are shown in FIG. 2 for Examples 34–38.

In Example 26, the 50/50 molar mixtures of 1,4-bis (ferrocenyl)butadiyne and 1,2,4,5-tetrakis(phenylethynyl) benzene were heated to 300° C. for one hour. The resulting thermoset retained 99% of its weight and was slightly attracted to a magnetic. This indicated some decomposition of the ferrocene. The compositions of Examples 27–29 were heated to between 400–500° C. and held at that temperature from 1 to 12 hours. The thermoset compositions held between 92 and 95% of their original weight and were each attracted to a magnet.

In Examples 22–24 and 40–41, 1-(ferrocenylethynyl-4-(phenylethynyl)benzene and 1,2,4,5-tetrakis(phenylethynyl) benzene in molar mixes of between 25–75 of 1-(ferrocenylethynyl)-4-(phenylethynyl)benzene and between 75–25 of 1,2,4,5-tetrakis(phenylethynyl)benzene were heated to 1000° C. to form carbon compositions. Each of the resulting carbon compositions was attracted to a magnetic indicating that metal nanoparticles were formed.

Examples 25 and 39 disclosed heating a mixture of 1,3-bis(ferrocenylethynyl)benzene and 1,2,4,5-tetrakis (phenylethynyl)benzene to 1000° C. to form carbon compositions in which iron nanoparticles were formed as indicated by their magnetic behavior.

The polymerization mixtures of the examples were melted and cured to a thermoset under an inert atmosphere. Decomposition of the organometallic moieties occurred during the heat treatment above 300° C. The size and concentration of metal nanoparticles and clusters were found to depend on the amount of various acetylene-containing compounds, temperature, and exposure time. Thermal analyses were used to study the formation and thermal stability of the various mixtures. Thermogravimetric analyses (TGA) and differential scanning calorimetric analyses (DSC) were performed on a TA SDT 2960, simultaneous DTA-TGA module and TA DSC 2930 modulated DSC, respectively, equipped with a TA 3100 thermal analyzer. All thermal analyses were performed using heating rates of 10° C./min under a nitrogen flow rate of 50 cm$^3$/min. Melting points were determined by DSC. X-ray diffraction studies were performed on a Rigaku SU-200 to determined the particle sizes.

By blending the organometallic containing compositions with the aromatic-acetylene containing compounds, two main things are achieved. They are as follows: 1. Both systems have acetylene units that can react with each other; and 2. The concentration of the iron nanoparticles can be controlled by using the different molar proportions.

Having described the invention, the following examples are given to illustrate specific applications of the invention, including the best mode now known to perform the invention. These specific examples are not intended to limit the scope of the invention described in this application.

EXAMPLES

Example 1

Polymerization and carbonization of 1,4-bis(ferrocenyl) butadiyne. 1,4-Bis(ferrocenyl)butadiyne (14.1 mg) was placed in a TGA/DTA chamber and heated under a nitrogen atmosphere at 10° C./min to 1000° C. The sample melted at about 203° C. followed by the immediate conversion to a thermoset as determined from exothermic peaking at 259° C. Between 350 and 500° C., the sample lost about 30% weight and resulted in the formation of an iron nanoparticle polymer composition. Upon further heating to 1000° C., the sample retained 64% of the original weight and was magnetic as determined from the attraction to a permanent bar magnet. X-ray diffraction data of iron particles in carbon composition showed an average size of about 100 Angstrom.

Example 2

Polymerization of 1,3-bis(ferrocenylethynyl)benzene. Compound 1,3-bis(ferrocenylethynyl)benzene (16.8 mg) was weighed into a TGA boat and polymerized by heating under a nitrogen atmosphere at 225° C. for 5 min, at 300° C. for 30 min and at 350° C. for 30 min, resulting in the formation of a solid, black thermosetting polymeric material. During the heat treatment, the sample lost about 11% of its weight. An FTIR spectrum of the polymer showed the absence of the acetylenic carbon-carbon triple bond absorption normally found in the monomer at 2215 $cm^{-1}$.

Example 3

Polymerization of 1,4-bis(ferrocenylethynyl)benzene. Compound 1,4-bis(ferrocenylethynyl)benzene (13.7 mg) was weighed into a TGA boat and polymerized by heating under a nitrogen atmosphere at 225° C. for 5 min, at 300° C. for 30 min and at 350° C. for 30 min, resulting in the formation of a solid, black thermosetting polymeric material. During the heat treatment, the sample lost about 16% of its weight. An FTIR spectrum of the polymer showed the absence of the acetylenic carbon-carbon triple bond absorptions normally found in the monomer at 2224 and 2202 $cm^{-1}$.

Example 4

Polymerization of 1-(ferrocenylethynyl)-3-(phenylethynyl)benzene. Compound 1-(ferrocenylethynyl)-3-(phenylethynyl)benzene (15.1 mg) was weighed into a TGA boat and polymerized by heating under a nitrogen atmosphere at 225° C. for 5 min, at 300° C. for 30 min and at 350° C. for 30 min, resulting in the formation of a solid thermosetting polymeric material. During the heat treatment, the sample lost about 12% of its weight. An FTIR spectrum of the polymer showed the absence of the acetylenic carbon-carbon triple bond absorption normally found in the monomer at 2212 $cm^1$.

Example 5

Formation of fibers from 1-(ferrocenylethynyl)-3-(phenylethynyl)benzene. Compound 1-(ferrocenylethynyl)-3-(phenylethynyl)benzene (0.5 g) was weighed into an aluminum planchet and heated at 275–300° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat treated at elevated temperature resulting in the formation of fibrous materials with magnetic properties.

Example 6

Polymerization of 1-(ferrocenylethynyl)-4-(phenylethynyl)benzene. Compound 1-(ferrocenylethynyl)-4-(phenylethynyl)benzene (15.1 mg) was weighed into a TGA boat and polymerized by heating under a nitrogen atmosphere at 225° C. for 5 min, at 300° C. for 30 min and at 350° C. for 30 min, resulting in the formation of a solid thermosetting polymeric material. During the heat treatment, the sample lost about 18% of its weight. An FTIR spectrum of the polymer showed the absence of the acetylenic carbon-carbon triple bond absorption normally found in the monomer at 2203 $cm^{-1}$.

Example 7

Carbonization of 1,3-bis(ferrocenylethynyl)benzene. 1,3-Bis(ferrocenylethynyl)benzene (15.0 mg) was heated in a TGA boat from room temperature to 1000° C. at 10° C./min under a nitrogen atmosphere, resulting in a char yield of 90%. The thermoset, which initially formed from reaction of the ethynyl moieties lost 7% of its weight 15 between 400 and 600° C. The remaining 3% was lost between 600 and 1000° C., resulting in carbonization and the formation of iron nanoparticles. The iron nanoparticle carbon composition was attracted to a bar (permanent) magnet, indicating ferromagnetic behavior.

Example 8

Polymerization of 1,2,4,5-Tetrakis(phenylethynyl) benzene. The monomer (0.26 g) was weighed into an aluminum planchet and cured by heating in air at 200° C. for 1 hour, at 225° C. for 2 hours, and at 275° C. for 1 hour resulting in solidification. Almost immediately after melting, the monomer started to darken. Within 45 minutes, the melt had become fairly viscous. After heating at 275° C., the polymer had not lost any weight. The polymer was removed from the planchet and used for characterization studies. An infrared spectrum showed the absence of an absorption centered normally found in the monomer at 2212 $cm^{-1}$ attributed to an acetylenic carbon carbon triple bond.

Example 9

Carbonization of 1,2,4,5-tetrakis(phenylethynyl)benzene. 1,2,4,5-Tetrakis(phenylethynyl)benzene (11.34 mg) was weighed into a pan, placed in a TGA/DTA chamber and heated at 10° C. under a nitrogen atmosphere from room temperature to 1000° C. resulting in a char yield of 81%. During the heat treatment, the sample melted at 197° C. and immediately started to cure as determined by an exotherm peaking at 293° C. The sample did not commence to lose weight until about 500° C. Most of the weight loss occurred between 500–600° C., which was attributed to carbonization.

Example 10

Polymerization of 1,3,5-Tris(phenylethynyl)benzene and Conversion into Carbon. The monomer (10.4 mg) was weighed into a TGA boat, polymerized, and carbonized by heating from 30 to 850° C. in nitrogen at 10° C./min. resulting in a char yield of 73%. Polymerization occurred during the heat treatment to 500° C. The monomer lost 13 wt % between 275 and 375° C. Between 375 and 500° C., little weight loss occurred. Carbonization occurred during the heat treatment above 500° C. From 500 to 600° C., another 10% weight loss occurred. Only a small weight loss occurred between 600 and 850° C. resulting in carbonization.

Example 11

Polymerization and carbonization of 1,2,4-Tris (phenylethynyl)benzene. The monomer (13.3 mg) was weighed into a TGA boat and cured by heating at 200° C. for 4 hours and at 250° C. for 4 hours. During the heat treatment, the sample loss approximately 6% weight. The polymer was then cooled. A thermogram was then determined on the polymer between 30° C. and 950° C. in a flow of nitrogen at 50 cc/min. The carbonized sample had a char yield of 82%.

Example 12

Carbonization of 1,4-bis(ferrocenylethynyl)benzene. 1,4-Bis(ferrocenylethynyl)benzene (12.56 mg) was weighed into a TGA sample holder and heated at 10° C. under a nitrogen atmosphere from room temperature to 1000° C. resulting in a char yield of 86%. The iron nanoparticle carbon composition was attracted to a bar (permanent) magnet, indicating ferromagnetic behavior. DSC studies showed that the monomer had a melting point of 257° C. and had an exotherm peaking at about 312° C. attributed to the cure to a thermoset.

Example 13

Carbonization of 1-ferrocenylethynyl-4-phenylethynylbenzene. 1-Ferrocenylethynyl-4-phenylethynylbenzene (10.81 mg) was weighed in a TGA pan, placed into a TGA/DTA chamber, and heated at 10° C. under a nitrogen atmosphere from room temperature to 1000° C. resulting in a char yield of 85%. The iron nanoparticle carbon composition was attracted to a bar (permanent) magnet, indicating ferromagnetic behavior. During the DTA scan, the sample was observed to melt at 204° C. and be show an exotherm peaking at 358° C. attributed to the cure to a thermoset.

Example 14

Pyrolysis of 1,3,5-tris(ferrocenylethynyl)benzene. 1,3,5-tris(ferrocenylethynyl)benzene (14.25 mg) was heated in a TGA boat from room temperature to 1000° C. at 10° C./min under a nitrogen atmosphere, resulting in a char yield of 83%. Polymerization to a thermoset, occurred by heating the sample from 200 to 500° C. Further heating to 1000° C. resulted in carbonization and the formation of an iron nanoparticle carbon composition. The iron nanoparticle carbon composition was attracted to a bar (permanent) magnet, indicating ferromagnetic behavior.

Example 15

Conversion of 75/25 molar mix of 1,4-bis(ferrocenyl) butadiyne and 1,2,4,5-tetrakis(phenylethynyl)benzene to metal/nanoparticle carbon composition. A 75/25 molar mixture prepared from 15.0 mg (0.0359 mmol) of 1,4-bis (ferrocenyl)butadiyne and 5.7 mg (0.0120 mmol) of 1,2,4, 5-tetrakis(phenylethynyl)benzene was ground with a mortar and pestle and thoroughly mixed. A sample (16.05 mg) of mixture was placed on a sample holder of TGA/DTA system and heated at 10° C. under a nitrogen atmosphere from room temperature to 1000° C. resulting in a char yield of 79%. During the DTA scan, the sample was observed to melt at 172 and 191° C. and to show an exotherm peaking at 243° C. attributed to the cure to a thermoset. The sample commenced to lose weight at about 350° C. An identified exotherm peaking at 717° C. was also observed. The iron nanoparticle carbon composition was attracted to a bar (permanent) magnet, indicating ferromagnetic behavior.

Example 16

Conversion of 50/50 molar mixture of 1,4-bis(ferrocenyl) butadiyne and 1,2,4,5-tetrakis(phenylethynyl)benzene to metal/nanoparticle carbon composition. A 50/50 molar mixture prepared from 8.7 mg (0.0208 mmol) of 1,4-bis (ferrocenyl)butadiyne and 10.0 mg (0.0209 mmol) of 1,2,4, 5-tetrakis(phenylethynyl)benzene was ground with a mortar & pestle and thoroughly mixed. A sample (15.25 mg) of mixture was placed on a sample holder of TGA/DTA system and heated at 110° C. under a nitrogen atmosphere from room temperature to 1000° C. resulting in a char yield of 86%. During the DTA scan, the sample was observed to melt at 175° C. and to be show an exotherm peaking at 246° C. attributed to the cure to a thermoset. The sample commenced to lose weight at about 410° C. An identified exotherm peaking at 751° C. was also observed. The iron nanoparticle carbon composition was attracted to a bar (permanent) magnet, indicating ferromagnetic behavior.

Example 17

Formation of fibers from 50/50 molar mixture of 1,4-bis (ferrocenyl)butadiyne and 1,2,4,5-tetrakis(phenylethynyl) benzene. A mixture prepared from 0.25 g of 1,4-bis (ferrocenyl)butadiyne and 0.28 g of 1,2,4,5-tetrakis (phenylethynyl)benzene was ground with a mortar and pestle and thoroughly mixed. The mixture was transferred to an aluminum planchet and heated at 225–300° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat treated at elevated temperature resulting in the formation of fibrous materials with magnetic properties.

Example 18

Conversion of 25/75 molar mixture of 1,4-bis(ferrocenyl) butadiyne and 1,2,4,5-tetrakis(phenylethynyl)benzene to metal/nanoparticle carbon composition. A 25/75 molar mixture prepared from 15.0 mg (0.0359 mmol) of 1,4-bis (ferrocenyl)butadiyne and 5.7 mg (0.0120 mmol) of 1,2,4, 5-tetrakis(phenylethynyl)benzene was ground with mortar and pestle and thoroughly mixed. A sample (18.97 mg) of mixture was placed on a sample holder of TGA/DTA system and heated at 10° C. under a nitrogen atmosphere from room temperature to 1000° C. resulting in a char yield of 87%. During the DTA scan, the sample was observed to melt at 183° C. and to show an exotherm peaking at 257° C. attributed to the cure to a thermoset. The sample commenced to lose weight at about 445° C. An identified exotherm peaking at 780° C. was also observed. The iron nanoparticle carbon composition was attracted to a bar (permanent) magnet, indicating ferromagnetic behavior.

Example 19

Conversion of 10/90 molar mixture of 1,4-bis(ferrocenyl) butadiyne and 1,2,4,5-tetrakis(phenylethynyl)benzene to metal/nanoparticle carbon composition. A 10/90 molar mixture prepared from 1.9 mg (0.0045 mmol) of 1,4-bis (ferrocenyl)butadiyne and 20.0 mg (0.0418 mmol) of 1,2,4, 5-tetrakis(phenylethynyl)benzene was ground with a mortar and pestle and thoroughly mixed. A sample (18.97 mg) of mixture was placed on a sample holder of TGA/DTA system and heated at 10° C. under a nitrogen atmosphere from room temperature to 1000° C. resulting in a char yield of 84%. During the DTA scan, the sample was observed to melt at 171 and 193° C. and to show an exotherm peaking at 286° C. attributed to the cure to a thermoset. The sample commenced to lose weight at about 445° C. An identified exotherm peaking at 814° C. was also observed. The iron nanoparticle carbon composition was attracted to a bar (permanent) magnet, indicating ferromagnetic behavior.

Example 20

Conversion of 50/50 molar mixture of 1,4-bis(ferrocenyl) butadiyne and 1,3,5-tris(phenylethynyl)benzene to metal/ nanoparticle carbon composition. A 50/50 molar mixture prepared from 8.7 mg (0.0208 mmol) of 1,4-bis(ferrocenyl) butadiyne and 7.9 mg (0.0209 mmol) of 1,3,5-tris (phenylethynyl)benzene was ground with a mortar and pestle and thoroughly mixed. A sample (13.25 mg) of mixture was placed on a sample holder of TGA system and heated at 10° C. under a nitrogen atmosphere from room temperature to 1000° C. resulting in a char yield of 81%. The iron nanoparticle carbon composition was attracted to a bar (permanent) magnet, indicating ferromagnetic behavior.

Example 21

Conversion of 50/50 molar mixture of 1,4-bis(ferrocenyl) butadiyne and 1,2,4-tris(phenylethynyl)benzene to metal/ nanoparticle carbon composition. A 50/50 molar mixture prepared from 9.5 mg (0.0227 mmol) of 1,4-bis(ferrocenyl) butadiyne and 8.6 mg (0.0229 mmol) of 1,2,4-tris (phenylethynyl)benzene was ground with a mortar and pestle and thoroughly mixed. A sample (13.35 mg) of mixture was placed on a sample holder of TGA system and heated at 10° C. under a nitrogen atmosphere from room temperature to 1000° C. resulting in a char yield of 78%. The iron nanoparticle carbon composition was attracted to a bar (permanent) magnet, indicating ferromagnetic behavior.

Example 22

Conversion of 50/50 molar mixture of 1-ferrocenylethynyl-4-phenylethynylbenzene and 1,2,4,5-tetrakis(phenylethynyl)benzene to metal/nanoparticle carbon composition. A 50/50 molar mixture prepared from 10.1 mg (0.0262 mmol) of 1-ferrocenylethynyl-4-phenylethynylbenzene and 20.0 mg (0.0259 mmol) of 1,2, 4,5-tetrakis(phenylethynyl)benzene was ground with a mortar and pestle and thoroughly mixed. A sample (18.04 mg) of mixture was placed on a sample holder of TGA/DTA system and heated at 10° C. under a nitrogen atmosphere from room temperature to 1000° C. resulting in a char yield of 85%. During the DTA scan, the sample was observed to melt at 176° C. and to show an exotherm peaking at 303° C. attributed to the cure to a thermoset. The sample commenced to lose weight at about 445° C. An identified exotherm peaking at 752° C. was also observed. The iron nanoparticle carbon composition was attracted to a bar (permanent) magnet, indicating ferromagnetic behavior.

Example 23

Conversion of 75/25 molar mixture of 1-ferrocenylethynyl-4-phenylethynylbenzene and 1,2,4,5-tetrakis(phenylethynyl)benzene to metal/nanoparticle carbon composition. A 75/25 molar mixture prepared from 15.0 mg (0.0389 mmol) of 1-ferrocenylethynyl-4-phenylethynylbenzene and 6.2 mg (0.0130 mmol) of 1,2,4, 5-tetrakis(phenylethynyl)benzene was ground with a mortar and pestle and thoroughly mixed. A sample (18.04 mg) of mixture was placed on a sample holder of TGA/DTA system and heated at 10° C. under a nitrogen atmosphere from room temperature to 1000° C. resulting in a char yield of 90%. During the DTA scan, the sample was observed to have a broad melting point peaking at 176° C. and to show an exotherm peaking at 319° C. attributed to the cure to a thermoset. The sample commenced to lose weight at about 425° C. An identified exotherm peaking at 752° C. was also observed. The iron nanoparticle carbon composition was attracted to a bar (permanent) magnet, indicating ferromagnetic behavior.

Example 24

Conversion of 25/75 molar mixture of 1-ferrocenylethynyl-4-phenylethynylbenzene and 1,2,4,5-tetrakis(phenylethynyl)benzene to metal/nanoparticle carbon composition. A 25/75 molar mixture prepared from 5.0 mg (0.0130 mmol) of 1-ferrocenylethynyl-4-phenylethynylbenzene and 18.5 mg (0.0388 mmol) of 1,2, 4,5-tetrakis(phenylethynyl)benzene was ground with a mortar and pestle and thoroughly mixed. A sample (14.07 mg) of mixture was placed on a sample holder of TGA/DTA system and heated at 10° C. under a nitrogen atmosphere from room temperature to 1000° C. resulting in a char yield of 84%. During the DTA scan, the sample was observed to have a broad melting point peaking at 186° C. and to show an exotherm peaking at 295° C. attributed to the cure to a thermoset. The sample commenced to lose weight at about 425° C. An identified exotherm peaking at 787° C. was also observed. The iron nanoparticle carbon composition was attracted to a bar (permanent) magnet, indicating ferromagnetic behavior.

Example 25

Conversion of 50/50 molar mixture of 1,3-bis (ferrocenylethynyl)benzene and 1,2,4,5-tetrakis (phenylethynyl)benzene to metal/nanoparticle carbon composition. A 50/50 molar mixture prepared from 10.0 mg (0.0202 mmol) of 1,3-bis(ferrocenylethynyl)benzene and 9.7 mg (0.0203 mmol) of 1,2,4,5-tetrakis(phenylethynyl) benzene was ground with a mortar and pestle and thoroughly mixed. A sample (15.82 mg) of mixture was placed on a sample holder of TGA/DTA system and heated at 10° C. under a nitrogen atmosphere from room temperature to 1000° C. resulting in a char yield of 84%. During the DTA scan, the sample was observed to have a broad melting point peaking at 187° C. and to show an exotherm peaking at 295° C. attributed to the cure to a thermoset. The sample commenced to lose weight at about 425° C. An identified exotherm peaking at 787° C. was also observed. The iron nanoparticle carbon composition was attracted to a bar (permanent) magnet, indicating ferromagnetic behavior.

Example 26

Conversion of 50/50 molar mixture of 1,4-bis(ferrocenyl) butadiyne and 1,2,4,5-tetrakis(phenylethynyl)benzene to metal/nanoparticle thermoset composition by heating at 300° C. for 12 hours. A 50/50 molar mixture (18.38 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 300° C. and held at 300° C. for 1 hour. The thermoset composition retained 99% of the original weight and was somewhat attracted to a bar (permanent) magnet, indicating that some decomposition of the ferrocene moieties had occurred.

Example 27

Conversion of 50/50 molar mixture of 1,4-bis(ferrocenyl)butadiyne and 1,2,4,5-tetrakis(phenylethynyl)benzene to metal/nanoparticle thermoset composition by heating at 400° C. for 1 hour. A 50/50 molar mixture (14.71 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 400° C. and held at 400° C. for 1 hour. The iron nanoparticle thermoset composition retained 95% of the original weight and was attracted to a bar (permanent) magnet, indicating ferromagnetic behavior.

Example 28

Conversion of 50/50 molar mixture of 1,4-bis(ferrocenyl)butadiyne and 1,2,4,5-tetrakis(phenylethynyl)benzene to metal/nanoparticle thermoset composition by heating at 400° C. for 12 hours. A 50/50 molar mixture (20.42 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 400° C. and held at 400° C. for 12 hour. The iron nanoparticle thermoset composition retained 93% of the original weight and was attracted to a bar (permanent) magnet, indicating ferromagnetic behavior.

Example 29

Conversion of 50/50 molar mixture of 1,4-bis(ferrocenyl)butadiyne and 1,2,4,5-tetrakis(phenylethynyl)benzene to metal/nanoparticle thermoset composition by heating at 500° C. for 1 hour. A 50/50 molar mixture (15.93 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 500° C. and held at 500° C. for 1 hour. The iron nanoparticle thermoset composition retained 92% of the original weight and was attracted to a bar (permanent) magnet, indicating ferromagnetic behavior.

Example 30

Conversion of 50/50 molar mixture of 1,4-bis(ferrocenyl)butadiyne and 1,2,4,5-tetrakis(phenylethynyl)benzene to metal/nanoparticle carbon composition by heating at 600° C. for 1 hour. A 50/50 molar mixture (15.66 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 600° C. and held at 600° C. for 1 hour. The iron nanoparticle carbon composition retained 89% of the original weight and was attracted to a bar (permanent) magnet, indicating ferromagnetic behavior.

Example 31

Conversion of 50/50 molar mixture of 1,4-bis(ferrocenyl)butadiyne and 1,2,4,5-tetrakis(phenylethynyl)benzene to metal/nanoparticle carbon composition by heating at 700° C. for 1 hour. A 50/50 molar mixture (15.93 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 700° C. and held at 700° C. for 1 hour. The iron nanoparticle carbon composition retained 87% of the original weight and was attracted to a bar (permanent) magnet, indicating ferromagnetic behavior.

Example 32

Conversion of 50/50 molar mixture of 1,4-bis(ferrocenyl)butadiyne and 1,2,4,5-tetrakis(phenylethynyl)benzene to metal/nanoparticle carbon composition by heating at 800° C. for 1 hour. A 50/50 molar mixture (13.24 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 800° C. and held at 800° C. for 1 hour. The iron nanoparticle carbon composition retained 87% of the original weight and was attracted to a bar (permanent) magnet, indicating ferromagnetic behavior.

Example 33

Conversion of 50/50 molar mixture of 1,4-bis(ferrocenyl)butadiyne and 1,2,4,5-tetrakis(phenylethynyl)benzene to metal/nanoparticle carbon composition by heating at 500° C. for 4 hours. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 500° C. and held at 500° C. for 4 hours. The iron nanoparticle carbon composition was attracted to a bar (permanent) magnet, indicating ferromagnetic behavior. X-ray diffraction data of nanoparticle carbon composition showed an average iron nanoparticle size of 8.9 nanometer.

Example 34

Conversion of 50/50 molar mixture of 1,4-bis(ferrocenyl)butadiyne and 1,2,4,5-tetrakis(phenylethynyl)benzene to metal/nanoparticle carbon composition by heating at 600° C. for 4 hours. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 600° C. and held at 600° C. for 4 hours. The iron nanoparticle carbon composition was attracted to a bar (permanent) magnet, indicating ferromagnetic behavior. X-ray diffraction data of nanoparticle carbon composition showed an average iron nanoparticle size of 16.6 nanometer.

Example 35

Conversion of 50/50 molar mixture of 1,4-bis(ferrocenyl)butadiyne and 1,2,4,5-tetrakis(phenylethynyl)benzene to metal/nanoparticle carbon composition by heating at 800° C. for 4 hours. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 800° C. and held at 800° C. for 4 hours. The iron nanoparticle carbon composition was attracted to a bar (permanent) magnet, indicating ferromagnetic behavior. X-ray diffraction data of nanoparticle carbon composition showed an average iron nanoparticle size of 28.0 nanometer.

Example 36

Conversion of 50/50 molar mixture of 1,4-bis(ferrocenyl)butadiyne and 1,2,4,5-tetrakis(phenylethynyl)benzene to metal/nanoparticle carbon composition by heating at 1000° C. for 4 hours. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 1000° C. and held at 1000° C. for 4 hours. The iron nanoparticle carbon composition was attracted to a bar (permanent) magnet, indicating ferromagnetic behavior. X-ray diffraction data of nanoparticle carbon composition showed an average iron nanoparticle size of 29.3 nanometer.

Example 37

Conversion of 50/50 molar mixture of 1,4-bis(ferrocenyl)butadiyne and 1,2,4,5-tetrakis(phenylethynyl)benzene to metal/nanoparticle carbon composition by heating to 1000° C. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 1000° C. and quickly cooled back to room temperature The iron nanoparticle carbon composition was attracted to a bar (permanent) magnet, indicating ferromagnetic behavior. X-ray diffraction data of nanoparticle carbon composition showed an average iron nanoparticle size of 19.7 nanometer.

Example 38

Conversion of 50/50 molar mixture of 1,4-bis(ferrocenyl)butadiyne and 1,2,4,5-tetrakis(phenylethynyl)benzene to metal/nanoparticle carbon composition by heating at 1400° C. for 2 hours. A 50/50 molar mixture (50 mg) of 1,4-bis(ferrocenyl)butadiyne and 1,2,4,5-tetrakis(phenylethynyl)benzene was placed in a platinum sample holder of TGA system and heated at 10° C. under a nitrogen atmosphere from room temperature to 1400° C. and held at 1400° C. for 2 hours. The iron nanoparticle carbon composition was attracted to a bar (permanent) magnet, indicating ferromagnetic behavior. X-ray diffraction data of nanoparticle carbon composition showed an average iron nanoparticle size of 31.3 nanometer.

Example 39

Conversion of 50/50 Molar Mixture of 1,3-bis(ferrocenylethynyl)benzene and 1,2,4,5-tetrakis(phenylethynyl)benzene to Metal/Nanoparticle Carbon Composition. A 50/50 molar mixture prepared from 10.3 mg (0.0208 mmol) of 1,3-bis(ferrocenylethynyl)benzene and 10.0 mg (0.0209 mmol) of 1,2,4,5-tetrakis(phenylethynyl)benzene was ground with a mortar and pestle and thoroughly mixed. A sample (12.25 mg) of mixture was placed in a sample holder of TGA system and heated at 10° C. under a nitrogen atmosphere from room temperature to 1000° C. resulting in a char yield of 84%. During the DTA scan, the sample was observed to melt at 187° C. and to show exotherms peaking at 295, 420, and 785° C. The iron nanoparticle carbon composition was attracted to a bar (permanent) magnet, indicating ferromagnetic behavior.

Example 40

Conversion of 75/25 molar mixture of 1-(ferrocenylethynyl)-4-(phenylethynyl)benzene and 1,2,4,5-tetrakis(phenylethynyl)benzene to metal/nanoparticle carbon composition. A 75/25 molar mixture prepared from 15.0 mg (0.0389 mmol) of 1-(ferrocenylethynyl)-4-(phenylethynyl)benzene and 6.2 mg (0.0130 mmol) of 1,2,4,5-tetrakis(phenylethynyl)benzene was ground with a mortar and pestle and thoroughly mixed. A sample (17.48 mg) of mixture was placed on a sample holder of TGA system and heated at 10° C. under a nitrogen atmosphere from room temperature to 1000° C. resulting in a char yield of 85%. The iron nanoparticle carbon composition was attracted to a bar (permanent) magnet, indicating ferromagnetic behavior.

Example 41

Conversion of 25/75 molar mixture of 1-(ferrocenylethynyl)-4-(phenylethynyl)benzene and 1,2,4,5-tetrakis(phenylethynyl)benzene to metal/nanoparticle carbon composition. A 25/75 molar mixture prepared from 4.0 mg (0.0104 mmol) of 1-(ferrocenylethynyl)-4-(phenylethynyl)benzene and 15.0 mg (0.0314 mmol) of 1,2,4,5-tetrakis(phenylethynyl)benzene was ground with a mortar and pestle and thoroughly mixed. A sample (14.07 mg) of mixture was placed on a sample holder of TGA system and heated at 10° C. under a nitrogen atmosphere from room temperature to 1000° C. resulting in a char yield of 85%. The iron nanoparticle carbon composition was attracted to a bar (permanent) magnet, indicating ferromagnetic behavior.

Obviously, many modifications and variations of the present invention are possible in light of the above teachings. It is therefore to be understood that, within the scope of the appended claims, the invention may be practiced otherwise than as specifically described.

What is claimed is:

1. A composition comprising:
   a composition having iron nanoparticles dispersed homogeneously throughout said composition, wherein said composition is formed by heating to a temperature of from about 300° C. and above a mixture of:
   a ferrocenylethynyl containing component selected from the group consisting of 1,4-bis(ferrocenyl)butadiyne, 1-ferrocenylethynyl-4-(phenylethynyl)benzene and 1,3-bis(ferrocenylethynyl)benzene; and
   an aromatic-acetylene containing component selected from the group consisting of 1,2,4,5-tetrakis(phenylethynyl)benzene, 1,2,4-tris(phenylethynyl)benzene and 1,3,5-tris(phenylethynyl)benzene; and
   wherein said ferrocenylethynyl containing component and said aromatic-acetylene containing component are in molar mix proportions of between 1 and 99 of said ferrocenylethynyl containing component and between 99 and 1 of said aromatic-acetylene containing component.

2. The composition of claim 1, wherein said mixture is heated to a temperature of from about 400° C.

3. The composition of claim 1, wherein said mixture is heated to a temperature of from about 500° C.

4. The composition of claim 1, wherein said mixture is heated to a temperature of from about 600° C.

5. The composition of claim 1, wherein said mixture is heated to a temperature of from about 700° C.

6. The composition of claim 1, wherein said mixture is heated to a temperature of from about 800° C.

7. The composition of claim 1, wherein said mixture is heated to a temperature of from about 900° C.

8. The composition of claim 1, wherein said mixture is heated to a temperature of from about 1000° C. and above.

9. The composition of claim 1, wherein said mixture is heated to a temperature greater than about 300° C. and held at said temperature for at least one hour.

10. The composition of claim 1, wherein said ferrocenylethynyl containing component and said aromatic-acetylene containing component arc in molar mix proportions of between 10 and 75 of said ferrocenylethynyl containing component and between 90 and 25 of said aromatic-acetylene containing component.

11. A method of forming a composition containing iron nanoparticles homogeneously dispersed throughout, said method comprising the steps of:

mixing between 1 and 99 molar proportion of 1,4-bis (ferrocenyl)butadiyne and between 99 and 1 molar proportion of an aromatic-acetylene containing component selected from the group consisting of 1,2,4,5-tetrakis(phenylethynyl)benzene, 1,3,5-tris (phenylethynyl)benzene and 1,2,4-tris(phenylethynyl) benzene;

heating said mixture for at least 1 hour at between 300 and 1000° C.; and forming a thermoset or a carbon composition having metal nanoparticles dispersed homogeneously throughout.

12. The method of claim 11, wherein said metal nanoparticles have a size of greater than 1 nm.

13. The method of claim 11, wherein there is a decrease in the weight of said mixture of less than 20% when said mixture is heated.

14. The method of claim 11, further comprising the step of controlling the temperature and time duration at said temperature thereby providing control over the size of the metal nanoparticle.

15. The method of claim 11, further comprising the step of forming thermoset fibers.

16. The method of claim 11, wherein said mixing is between 10 and 75 molar proportion of said 1,4-bis(ferrocenyl)butadiyne and between 90 and 25 molar proportion of said aromatic-acetylene containing component;

heating said mixture at between 300 and 1000° C; and forming a thermoset or a carbon composition having metal nanoparticles dispersed homogeneously throughout.

17. A composition having iron nanoparticles dispersed homogeneously throughout, formed by heating to a temperature of from about 300° C. and above a mixture of:

an organometallic component and an aromatic-acetylene containing component;

wherein said organometallic component comprises the formula:

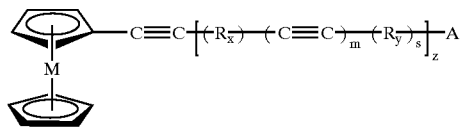

wherein A is selected from the group consisting of H,

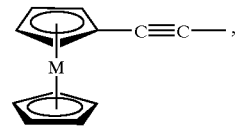

and

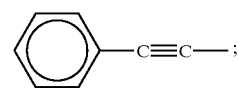

wherein M is a metal selected independently from the group consisting of Fe, Mn, Ru, Co, Ni, Cr and V;

wherein $R_x$ is independently selected from the group consisting of an aromatic, a substituted aromatic group and combinations thereof;

wherein $R_y$ is independently selected from the group consisting of an aromatic, a substituted aromatic group and combinations thereof;

wherein m is $\geq 0$;

wherein s is $\geq 0$;

wherein z is $\geq 0$;

wherein in and a are independently determined in each repeating unit;

wherein said aromatic-acetylene containing component is selected from the group consisting of 1,2,4,5-tetrakis (phenylethynyl)benzene and 1,3,5-tris(phenylethynyl) benzene; and wherein said organometallic component and said aromatic-acetylene containing component are in molar mix proportions of between 1 and 99 of said organometallic component and between 99 and 1 of said aromatic-acetylene containing component.

18. The composition of claim 17, wherein said organometallic component and said aromatic-acetylene containing component are in molar mix proportions of between 10 and 75 of said organometallic component and between 90 and 25 of said aromatic-acetylene component.

19. The composition of claim 16, wherein the heating step comprises heating for at least one hour at between 300 and 1000° C.

* * * * *